United States Patent [19]
Carnahan et al.

[11] 3,947,277
[45] Mar. 30, 1976

[54] DUPLEX RESISTOR INKS

[75] Inventors: Robert D. Carnahan, Barrington; Karl J. Youtsey, Chicago, both of Ill.

[73] Assignee: Universal Oil Products Company, Des Plaines, Ill.

[22] Filed: Dec. 19, 1973

[21] Appl. No.: 426,278

[52] U.S. Cl. ............... 106/26; 106/28; 106/30; 106/32; 252/506; 252/507; 252/508; 252/511; 260/37 R; 260/41 A; 260/41 B
[51] Int. Cl.² .. C09D 11/14; H01B 1/06; H01C 7/00
[58] Field of Search ............... 106/19–32, 106/286; 117/221, 227, 106 C, 212; 252/502, 506, 507, 508, 510, 514, 520, 521; 96/1.5; 260/37 R, 37 M, 41 A, 41 B

[56] References Cited
UNITED STATES PATENTS

| | | | |
|---|---|---|---|
| 1,127,578 | 2/1925 | Baldwin | 252/507 |
| 1,947,692 | 2/1934 | Beyer | 252/508 X |
| 2,610,126 | 9/1952 | Kerridge et al. | 106/26 |
| 2,671,735 | 3/1954 | Grisdale et al. | 117/46 |
| 2,823,146 | 2/1958 | Roberts et al. | 106/20 X |
| 3,162,551 | 12/1964 | Short | 252/514 X |
| 3,262,005 | 7/1966 | Riek | 252/506 X |
| 3,414,417 | 12/1968 | Miller et al. | 106/26 |
| 3,442,787 | 5/1969 | Landrum et al. | 252/506 |
| 3,538,021 | 11/1970 | Achey | 252/506 |
| 3,598,761 | 8/1971 | Woulbroun et al. | 117/227 X |
| 3,651,386 | 3/1972 | Youtsey | 136/89 |
| 3,655,440 | 4/1972 | Brady | 117/227 |
| 3,740,217 | 6/1973 | Gramza et al. | 96/1.5 |
| 3,776,772 | 12/1973 | Asada et al. | 117/227 |
| 3,782,989 | 1/1974 | Mansur | 117/227 |
| 3,846,140 | 11/1974 | Youtsey et al. | 106/20 |

*Primary Examiner*—Joan E. Welcome
*Attorney, Agent, or Firm*—James R. Hoatson, Jr.; Raymond H. Nelson; William H. Page, II

[57] ABSTRACT

Electrical resistor inks comprising a mixture of a semiconducting pyropolymeric inorganic material and a transition metal oxide along with a vehicle consisting of a binder such as a synthetic resin or a varnish and a suitable solvent or oil, etc. are useful in forming resistors in electrical circuits, the resistor ink possessing a temperature coefficient of resistance of less than about 500 ppm/° C.

15 Claims, No Drawings

DUPLEX RESISTOR INKS

This invention relates to electrical resistor inks and more particularly to electrical resistor inks which contain a mixture of a semiconducting pyropolymeric inorganic refractory oxide material and certain transition metal oxides. In addition, the invention also relates to resistors which are formed from these electrical resistor inks.

Heretofore it has been known in the prior art that resistor inks may be prepared by utilizing a carbon or graphite pigment in a resin binder. However, the use of carbon black or graphite has a number of disadvantages, among them: (a) the rheological properties of the inks are highly variable because of the variety of formulations required to produce a series of resistance values, (b) the electronic performance characteristics vary for the various formulations for the same reason and (c) batch to batch reproducibility of a given formulation is poor because of the variability of carbon black and graphite properties. In addition to the aforementioned disadvantages, another particular disadvantage which is present is that the temperature coefficient of resistance varies over a relatively wide range. This is of particular importance inasmuch as when an electrical component system is operated over a wide range of temperature environments such as being operated at temperatures below 0° F. or over 100° F., it is an advantage to have a stability of the specifications for the circuit system. In order to effect this stability, it is necessary that the temperature coefficient of resistance be within a relatively narrow range. For example, resistors which are utilized in electrical circuits may be divided into classes, one class comprising a composition resistor in which the temperature coefficient of resistance is greater than 1000 ppm/° C. In contrast to this, certain resistors which are known as precision resistors may have the temperature coefficient of resistance only vary from −150 to +150 ppm/° C., these resistors being known as Class I Precision Resistors or other precision resistors known as Class II Precision Resistors in which the temperature coefficient of resistance varies from −500 to +500 ppm/° C. Therefore, it is an advantage to produce precision resistors which may be utilized as components of electrical circuits.

The disadvantages which have been hereinbefore enumerated may be eliminated by utilizing a mixture of a semi-conducting pyropolymeric inorganic refractory oxide material and certain transition metal oxides as the pigment of an electrical resistor ink. By utilizing a pigment which comprises a mixture of these two components and which will possess controllable resistivities as well as temperature coefficient of resistance of less than 500 ppm/° C., it is possible to obtain a broad range of reproducible resistor characteristics. The resistance value of the resistor made from a given ink is controlled by selecting the resistivity of the oxide material and not by controlling the volume concentration of resistive pigment in the vehicle, as in the case of the carbon or graphite inks. By having a constant and optimum volume concentration of the oxide material in the primary vehicle for all resistance values, it is possible to insure uniform rheological properties for screening purposes. Another advantage of utilizing the electrical resistor inks of the present invention is that there will be inherently lower current noise in the resulting resistors as contrasted with the noise level found when utilizing carbon or graphite inks. In addition, there is no requirement for electrical lead attachments, and the inks, when dried, are easily trimmed by conventional laser and/or abrasive trimming techniques. Yet another advantage of utilizing the electrical resistor inks of the present invention is that the curing of the ink formulations can be effected at room temperature or can be air or oven dried if desired.

Electrical resistor inks which constitute the present invention may find a wide variety of uses in the electrical field. For example, one application of resistor inks is to produce direct substitutes for discrete resistors in all types of electrical circuits, a particularly advantageous use being in connection with laminated printed circuit boards. The electrical resistor ink can be applied to either side of the circuit board, that is, the component side or the foil side, prior to the final soldering step in which discrete components are electrically attached. In addition, either single- or multi-layered circuit boards are suitable. For example, in the latter case, where multiple layers of circuits are involved, direct incorporation of the printed resistors in the layers provides an obvious benefit in lowering component densities where discrete components must be attached, thus resulting in a significant saving of space. In addition to the use hereinbefore described in laminated printed circuit boards the electrical resistor ink can be used to produce radiant heating panels for use in building construction in which the ink is applied to an inner sheet of panel prior to final lamination; coating an insulating fiber; as an anti-static spray to protect surfaces from static charge accumulation or as window defrosters in which the electrical resistor ink is applied in the form of a fine line to a window surface and after drying will act as a heating element. It is therefore readily apparent that the uses of an electrical resistor ink of the type hereinafter set forth in greater detail are widely varied and therefore an electrical resistor ink which possesses certain advantageous properties will be very desirable.

It is therefore an object of this invention to provide an electrical resistor ink which possesses certain advantageous properties.

Another object of this invention is to provide an electrical resistor ink containing, as one component thereof, a mixture of a semiconducting pyropolymeric inorganic refractory oxide material and a transition metal oxide, said electrical resistor ink possessing a temperature coefficient of resistance of less than 500 ppm/° C.

In one aspect an embodiment of this invention resides in an electrical resistor ink comprising a resistive component and a vehicle therefor, the improvement which comprises utilizing as the resistive component thereof from about 10% to about 97% of a mixture of a transition metal oxide and a semi-conducting pyropolymeric material comprising a refractory inorganic oxide with a mono-layer of a carbonaceous pyropolymer formed on the surface thereof.

A specific embodiment of this invention is found in an electrical resistor ink comprising a resistive component consisting of a mixture of a semi-conducting pyropolymeric inorganic refractory oxide material and rhenium oxide, said mixture being present in an amount of from about 10% to about 97% and a vehicle comprising varnish and isopropyl alcohol.

Another specific embodiment of this invention is found in a resistor which is formed by applying an electrical resistor ink upon a solid surface and drying said ink.

Other objects and embodiments referring to various transition metal oxides, vehicles and semi-conducting pyropolymeric inorganic refractory oxide materials will be found in the following further detailed description of the present invention.

As hereinbefore set forth the present invention is concerned with electrical resistor inks which may be utilized in the preparation of resistors which possess certain desirable temperature coefficients of resistance. The term "ink" as used in the present specification and appended claims will refer to a liquid composition which may be used in the form of an ink such as a paste, as a paint, etc. The ink will comprise a mixture of a semi-conducting pyropolymeric inorganic refractory oxide material and a transition metal oxide in a vehicle. The vehicle may be a mixture of a synthetic or naturally occurring resin, a binder and a solvent in which the oxide materials are suspended, or may be an oil or a mixture of an oil and a separate binder. In addition, it is also contemplated within the scope of this invention that the ink may also contain added accessories such as anti-skinning agents, drying agents, colored pigments, dryers, waxes, talcs, extending or viscous varnishes, thinners, body gums, shorteners and lengtheners, perfumes, plasticizers, anti-foam compounds, etc.

As previously discussed prior art inks or paints which contain carbon or graphite as a resistive component of the mixture are subject to certain disadvantages. For example, the temperature coefficient of resistance of carbon and graphite is relatively large in magnitude and therefore a resistor resulting from the use of inks containing these materials will not possess high stability when subjected to temperature changes. In addition, resistors made from these materials may possess other disadvantages such as relatively high current noise characteristics. A further disadvantage is in batch to batch non-reproducibility of carbon and graphite ink formulation of ±25% to ±45% of the effective resistance values. By utilizing a mixture of a semi-conducting pyropolymeric inorganic refractory oxide material of the type hereinafter set forth in greater detail plus a transition metal oxide of the type hereinafter set forth in greater detail as the resistive component of the finished composition of matter, it is possible to overcome these disadvantages and provide a resistor which is tough, flexible and flake-resistant; will compete costwise effectively with discrete carbon resistors while yielding equivalent or superior performance characteristics; will have a relatively low current noise as contrasted with carbon inks; will require lower curing temperatures to provide a stable resistance; and will also possess a temperature coefficient of resistance which is less than 500 ppm/° C. and will be stable over a wide range of temperatures. The semi-conducting pyropolymeric inorganic refractory oxide material may comprise a mono-layer of a carbonaceous pyropolymer formed on the surface of a refractory oxide material. The semi-conducting pyropolymeric inorganic refractory oxide material may be prepared by heating an organic compound in the absence of oxygen and passing the pyrolyzable substance over the refractory oxide material in the vapor phase to deposit a carbonaceuos pyropolymer thereon. The refractory oxide material which may be used as the base may be in any form such as loose or compacted dry powders, cast or calcined sols, heated sols, substrates in the form of flats, cylinders, and spheres, rods, pellets, etc. In the preferred embodiment of the present invention the refractory oxide base will be characterized as having a surfacce area of from 1 to about 500 square meters per gram. Illustrative examples of the refractory oxides which may be used will include alumina in various forms such as gamma-alumina and silica-alumina. In addition, it is also contemplated that the refractory oxide may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the pyropolymer on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromomethane, chloroethane, bromoethane, chloropropane, bromopropane, iodopropane, chlorobutane, bromobutane, iodobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-butyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitropropane, 1-nitrobutane, acetonitrile, propionitrile, formic acid, acetic acid, oxalic acid, acrylic acid, formaldehyde, acid aldehyde, propionaldehyde, acetone, methyl ethyl ketone, methyl propyl ketone, ethyl propyl ketone, methyl formate, ethyl formate, ethyl acetate, benzyl chloride, phenol, o-cresol, benzyl alcohol, hydroquinone, resorcinol, catechol, anisole, phenetole, benzladehyde, acetophenone, benzophenone, benzoquinone, benzoic acid, phenyl acetate acid, hydrocinnamic acid, furan, furfural, pyran, coumarin, indole, carbohydrate derivatives such as sugars including dextrose, fructose, sucrose, starches, etc. It is to be understood that the aforementioned compounds are only representative of the class of compounds which may undergo pyropolymerization and that the present invention is not necessarily limited thereto.

As hereinbefore set forth the aforementioned organic compounds are admixed with a carrier gas such as nitrogen or hydrogen, heated and passed over the refractory oxide base. The deposition of the pyropolymer on the surface of the base is effected at relatively high temperatures ranging from about 400° to about 800° C. and preferably in a range of from about 600° to about 750° C. It is possible to govern the electrical properties of the semi-conducting pyropolymeric inorganic refractory oxide material by regulating the temperature and the residence time during which the refractory oxide base is subjected to the treatment with the organic pyrolyzable substance. The thus prepared semi-conducting pyropolymeric inorganic refractory oxide material when recovered will possess a resistivity in the range of from about $10^{-2}$ to about $10^8$ ohm-centimeters. While the above material describes one specific method of preparing a semi-conducting pyropolymeric inorganic refractory oxide material, it is to be understood that we do not wish to be limited to this method of preparing the material, and that any suitable method in which a mono-layer of a carbonaceous material is formed on the surface of a refractory oxide material may also be used to prepare one of the elements of the resistive component of the ink.

The aforementioned semi-conducting pyropolymeric inorganic refractory oxide material is admixed with certain transition metal oxides which possess specific electrical properties to form the pigment for a resistor ink. Inasmuch as the semi-conducting pyropolymeric inorganic refractory oxide material will possess a negative temperature coefficient of resistance, the conducting transition metal oxides which are used will have a compensating positive temperature coefficient of resistance. Examples of these transition metal oxides which may be employed as one component of the pigment of a resistor ink will include titanium oxide, zirconium oxide, vanadium oxide, chromium oxide, tungsten oxide, niobium oxide, tantalum oxide, osmium oxide, rhodium oxide, molybdenum oxide, iridium oxide, calcium vanadate, lanthanum titanate, calcium molybdate, strontium molybdate, barium molybdate, strontium ruthenate, calcium ruthenate, cadmium rhenate, etc.

The aforementioned transition metal oxides and the semi-conducting pyropolymeric inorganic refractory oxide material will be admixed in any suitable manner such as physical admixture, milling, etc., the ratio of semi-conducting pyropolymeric inorganic refractory oxide material to the transition metal oxide being dependent upon the temperature coefficient of resistance of the various oxides as well as the semi-conducting pyropolymeric inorganic refractory oxide material. For example, the temperature coefficient of resistance of the semi-conducting pyropolymeric inorganic refractory oxide material may be in a range of from about $-800$ to about $-2500$ ppm/° C. while the positive temperature coefficient of resistance of the various oxides may range from about $+800$ ppm/° C. in the case of titanium oxide, $+2600$ ppm/° C. in the case of rhenium oxide or $+5800$ ppm/° C. in the case of rhenium oxide. Generally speaking, the weight percent of semi-conducting pyropolymeric inorganic refractory oxide material in the mixture with a transition metal oxide will be in a range of from about 25% up to about 90%.

The mixture of the semi-conducting pyropolymeric inorganic refractory oxide material and the transition metal oxide may be admixed with other components which make up the final electrical resistor ink. These other components will act as a medium in which the semi-conducting pyropolymeric inorganic refractory oxide material is carried, and will comprise ingredients which will impart suitable rheological and drying properties to the ink during the application of said ink and desirable physical and electrical properties to the resistor after the ink has set. The suitable rheological properties are dictated by the particular product during the application. For example, if the ink is to be applied by silk screening, the ink must have the pseudoplastic properties of low viscosity at high shear rates and high viscosity at low shear rates. This allowed the ink to be easily passed through the screen and at the same time will prevent an excessive flow after the application. In addition drying times must be compatible with the application procedure, i.e., must be long enough to prevent equipment fouling but short enough to allow handling and resistor trimming at the earliest possible time. Another important aspect of the formulation of resistive inks is that an electrical continuity must be established between the conductive particles after the ink has dried. Therefore setting of the ink must involve a certain amount of shrinkage so that the excess vehicle or medium by the inter-particle contact points is eliminated. Vehicles which do not have this shrinking property merely encapsulate the conductive particles and do not produce a suitable resistive material. Furthermore, the vehicle properties which are imparted to the finished product constitute another important aspect of resistive ink formulations. The finished resistor, in addition to adhering firmly to the surface on which it is applied, must also make good electrical contact to conductors on which it is applied as well as being reasonably resistant to abrasion and reasonably mechanically flexible.

Therefore, the medium in which the mixture of the semi-conducting pyropolymeric inorganic refractory oxide material and transition metal oxide is carried must meet the aforementioned qualifications. This medium in which the mixture of the semi-conducting pyropolymeric inorganic refractory oxide material and transition metal oxide is carried will comprise a binder and a solvent or oil. Examples of binders which may comprise synthetic or naturally occurring compounds will include naturally occurring compounds such as casein, soya bean oil derivatives, shellac, natural rubber, natural resins such as copals, congos, kauris, gum batu, gilsonite, asphaltic pitches, rosin, shellac, gum elemi, mastic, etc. or synthetic compounds including thermoplastic resins such as polystyrene, polyamide, alkyd resins, acrylic esters, cellulose esters and ethers, polyvinyl alcohol derivatives, etc. or thermosetting resins such as phenolic resins, epoxy resin, melamine resins, unsaturated polyesters, vinyl copolymer resins, urea resins, or varnish, etc., the varnish comprising an oil varnish, a spar varnish, a bituminous varnish, etc.; nitrocellulose, ethyl cellulose.

The oils and solvents which comprise the other component of the vehicle are differentiated on the basis of their viscosity. For example, liquids with a viscosity of less than 0.1 poise at 77° F. are classified as solvents while liquids of a viscosity greater than 1.0 poise at 77° F. are classified as oils, liquids with viscosities between the above two values being classified as either solvents or oils by convention. In addition, the oils may be classified into three groups depending upon their drying characteristics, these classes being (1) a drying oil, (2) a semi-drying oil, and (3) a non-drying oil. In the preferred embodiment of the present invention the preferred oil which may be used as the vehicle for the ink will comprise a drying oil, although other oils may be used as special ingredients for special purposes such as providing plasticity to the ink. Examples of drying oils which may be used will include linseed oil, tung oil, oiticica oil, perilla oil, dehydrated castor oil, safflower oil, soya bean oil, rosin oil, tall oil, hempseed oil, poppyseed oil, etc. Semi-drying oils which may be used will include cottonseed oil, rapeseed oil, corn oil, etc. Examples of non-drying oils will include castor oil, peanut oil, olive oil, neatsfoot oil, lard oil, sperm oil, etc. The drying oils may be used as bodying agents, the viscosity of which may be controlled by metal-catalyzed oxidation or thermally-induced polymerization. The solvents which may be used with resin binders and the conductive material may be classified on the basis of their composition, said solvents including hydrocarbon solvents, alcohols, aldehydes, acids, ethers, ketones, glycols, and esters. Some specific examples of solvents which may be employed include n-pentane, n-hexane, benzene, toluene, the isomeric xylenes, ethylbenzene, ethyl alcohol, n-propyl alcohol, isopropyl alcohol, n-butyl alcohol, acetaldehyde, propionaldehyde, butyraldehyde, acetic acid, propionic acid, phthalic acid, acetone, methyl ethyl ketone, methyl propyl ketone, methyl isopropyl ketone, methyl isobutyl ketone, ethyl propyl ketone, etc., ethylene glycol, diethylene glycol, triethylene glycol, mineral spirits, butyl acetate, amyl acetate, ethylene glycol monoethyl ether acetate, ethylene glycol monobutyl ether, ethylene glycol monoethyl ether, etc.

In addition to the three components hereinbefore set forth, it is also contemplated within the scope of this invention that the electrical resistor ink may also contain other components which will go to make up the finished composition of matter. The other components which are added to the ink will impart certain properties, said components including dryers, plasticizers, anti-skinning agents, waxes such as petroleum waxes, carnauba wax, talcs, perfumes to mask unpleasant odors or to hide the presence of vital ingredients, or a color pigment which may be used for coding purposes. Examples of dryers which may be added include other metal powders such as cobalt powder, manganese powder, lead powder, or zirconium powder, plasticizers which may be added include soft resins, tributyl phosphate, castor oil; while anti-skinning agents which may be added will include, for example, hydroquinone, cathechol, resorcinol, guaiacol, pyrogallol, eugenol, 2,5-di-t-butylhydroquinone, 2-butanone oxime, 2-pentanone oxime, etc. It is to be understood that the aforementioned examples of binders, oils, solvents and additives are only representative of the class of compounds which may be used as component of electrical resistor inks, and that the present invention is not necessarily limited thereto.

The electrical resistor ink may be prepared in any suitable manner. For example, the semi-conducting pyropolymeric inorganic refractory oxide material which had been prepared according to the method hereinbefore set forth, or by any other method known in the art, may be prepared by grinding the material to an appropriate particle size, said particle size being determined by the desired rheological property of the vehicle, and by the requirements for screening, i.e. lines/inch, etc. In the preferred embodiment of the invention the most desired particle size is that which produces a colloidal suspension of the semi-conducting pyropolymeric inorganic refractory oxide material in the vehicle. Generally speaking, the material should possess a particle size of less than 20 microns and preferably particles less than 10 microns are desirable, the optimum size being less than 1 micron. The thus prepared semi-conducting pyropolymeric inorganic refractory oxide material is admixed with the desired transition metal oxide in a predetermined ratio of components in order to provide the desired temperature coefficient of resistance, said temperature coefficient of resistance being less than 500 ppm/° C. The thus prepared mixture is then admixed with the medium by blending with the binder and with the oil or solvent.

Alternatively, the mixture of the semi-conducting pyropolymeric inorganic refractory oxide material and transition metal oxide will be admixed with the vehicle component such as the solvent and thereafter ground by means of a roll mill, colloidal mill, or ball mill until the particle size previously determined, that is, less than 10 microns and, if so desired, less than 1 micron, is obtained. Following this, the components may be thereafter blended with the binder by means of an inverted blender, mill, etc. The mixture of the semi-conducting pyropolymeric inorganic refractory oxide material and the transition metal oxide may be present in the finished resistor ink in an amount determined by the rheological properties of the ink and the electrical and physical properties of the resistors which result therefrom. Generally speaking, the mixture of the semi-conducting pyropolymeric inorganic refractory oxide material and the transition metal oxide will be present in the finished electrical resistor ink in an amount in the range of from about 10% to about 95% by weight of the finished composition of matter and preferably in a range of from about 50 to about 90% by weight. As hereinbefore set forth, the electrical resistor ink may also contain other components of the type hereinbefore set forth in greater detail such as preserving agents, color pigments, plasticizers, dryers, etc. these components also being added to the three component mixture of the ink in necessary amounts.

The electrical resistor inks which have been prepared according to the process hereinbefore set forth and which may contain a wide variety of components are formulated for application by any of a variety of methods. Some examples of the way in which the electrical resistor ink may be applied include slik screening, printing, painting, spraying, etc. each application method presenting a different set of rheological conditions which must be met by the particular formulation of the vehicle in which the conductive material is carried. The electrical resistor ink is applied to an appropriate surface such as a printed circuit board in any convenient manner and upon completion of the drying step will form the desired resistor. The wet inks may be either air dried or taken through a predetermined temperature cycle to produce the finished resistor. The particular temperature which is to be employed in the drying cycle will, of course, be dependent upon the particular formulation of the ink vehicle, i.e., whether the vehicle contains a drying oil, a non-drying oil, a semi-drying oil, a solvent or mixtures thereof and may be adjusted to satisfy the individual requirements. The resistors of the finished product will be a function of the resistivity of the conductive material which is present and also of the geometry of the printed resistor. The adjustment of the final value of the resistor can be effected by trimming the particular resistor using standard techniques such as physically removing some of the resistive material by means of grit blasting or by removal of the material utilizing a laser beam.

The resistor after removal of the solvent or oil will form a material, the surface of which possesses a considerable toughness and strength and will be able to withstand abrasion. Therefore, it is contemplated within the scope of this invention to employ the thus formed resistor as a variable resistor in which the electrical contact may be moved over the surface of said resistor utilizing a sufficient amount of pressure to insure complete contact at all times without changes in the resistance due to wear on the surface of the resistor caused by the aforesaid abrasion. In addition, the thus formed resistor will possess a temperature coefficient of resistance in a range of from about +500 ppm/° C. to about −500 ppm/° C., maintaining a relatively constant temperature coefficient when utilized over a wide range of temperatures.

The following examples are given to illustrate the electrical resistor inks and resistors of the present invention. However, these examples are not intended to limit the generally broad scope of the present invention in strict accordance therewith.

EXAMPLE I

In this example 75 grams of a semi-conducting pyropolymeric inorganic refractory oxide material which is prepared by treating gamma-alumina with benzene at 700° C. for a period of 4 hours and which will possess a resistivity of $10^0$ ohm-centimeters is milled with 20 cc. of a solvent comprising isopropyl alcohol in a ball mill until the size of the semi-conducting pyropolymeric inorganic refractory oxide material is less than 10 microns. Thereafter the material is admixed with 37 grams of rhenium oxide ($ReO_3$) and the resulting mixture is again milled to reduce the size of the rhenium oxide particles. After thorough admixing and when the mixture has been ground to the desired size, 50 grams of a binder comprising varnish is added to the suspension and thoroughly admixed for an additional period of 0.5 hours. The resulting electrical resistor ink is painted on a laminated board in a strip which is ⅛ inch wide by ½ inch long and 0.005 inch thick. The resulting resistor will have a resistance of 750 ohms and a temperature coefficient of resistance of −400 ppm/° C.

EXAMPLE II

An electrical resistor ink is prepared by suspending 80 grams of a semi-conducting pyropolymeric inorganic refractory oxide material which is prepared by treating gamma-alumina with benzene at a temperature of 700° C. for a period of 3 hours in 100 cc. of methyl isobutyl ketone. In addition, 15 grams of ruthenium oxide ($RuO_2$) is also added to the suspension and thereafter the suspension is milled for a period of time sufficient to reduce the particle size of the semi-conducting pyropolymeric inorganic refractory oxide material and ruthenium oxide to less than 10 microns. After reaching this size, 20 grams of a copolymeric mixture of vinyl chloride, vinyl acetate and vinyl alcohol resin is added and the mixture is mixed in an inverted blender to insure complete integration of the components of the ink. The resulting electrical resistor ink is again painted on a laminated board in a manner similar to that set forth in Example I above. After dyring, the resulting resistor will possess a resistance of 6100 ohms and a temperature coefficient of −300 ppm/° C.

EXAMPLE III

To prepare an electrical resistor ink a refractory oxide substrate comprising spray-dried gamma-alumina is ground to a powder and calcined at a temperature of about 600° C. for a period of 2 hours to drive off the moisture content. Following this an aqueous solution of dextrose containing 0.60 grams of extrose per cc. is prepared and utilized to impregnate the powdered gamma-alumina in an evaporating dish at room temperature for a period of 15 minutes on a basis of 100 grams of gamma-alumina per 124.5 cc. of dextrose solution. A homogeneous slurry is produced following which the dextrose-impregnated alumina is placed in an evaporating dish in an air flow oven and dried at a temperature of 130° C. for a period of 8 hours. The dried, impregnated product is thereafter pyrolyzed at atmospheric pressure in a nitrogen atmosphere at a temperature of 900° C. for a period of 1.5 hours. The semi-conducting pyropolymeric inorganic refractory oxide material is recovered following which 75 grams of this material along with 34 grams of titanium oxide (TiO) are suspended in 100 cc. of mineral spirits. The mixture is milled in a ball mill to reduce the particle size of the semi-conducting pyropolymeric inorganic refractory oxide material-titanium oxide mixture to less than 10 microns. Following this 50 grams of an alkyd resin is added and the components are mixed in an inverted blender for a period of 0.5 hours. The electrical resistor ink is painted on a laminated board in a manner similar to that set forth in Example I above, the resistor which is formed thereby possessing a resistance of 1200 ohms and a temperature coefficient of resistance of −300 ppm/° C.

EXAMPLE IV

In this example 75 grams of a semi-conducting pyropolymeric inorganic refractory oxide material which is prepared by treating gamma-alumina with cyclohexane in a nitrogen carrier at a temperature of 700° C. for a period of 4 hours along with 30 grams of niobium oxide (NbO) are suspended in 100 cc. of methyl alcohol. The mixture is placed in a ball mill and treated to reduce the particle size of the semi-conducting pyropolymeric inorganic refractory oxide material-niobium oxide mixture to less than 10 microns. When the particle size of the mixture has reached the desired level, 50 grams of ethyl cellulose is added and the components are mixed in an inverted blender for a period of 0.5 hours to insure complete integration of the components of the mixture. Again the resulting electrical resistor ink is painted on a laminated board in a strip which is ⅛ inch wide by ½ inch long and 0.005 inch thick. After drying, the resulting resistor will have a resistance of 15,400 ohms and a temperature coefficient of resistance of − 500 ppm/° C.

We claim as our invention:

1. An electrical resistor ink possessing a temperature coefficient of resistance of from about +500 ppm/° C to about −500 ppm/° C comprising a resistive component and a vehicle containing a binder of synthetic or natural resin and a solvent, oil or mixture thereof, said resistive component comprising from about 10% to about 97% of a mixture of an alumina or silica-alumina base having a mono-layer of a carbonaceous pyropolymer on the surface thereof and an oxide of a transition metal selected from the group consisting of titanium, zirconium, vanadium, chromium, tungsten, niobium, tantalum, rhenium, osmium, ruthenium, rhodium, molybdenum, iridium, calcium, lanthanum, strontium, barium, and cadmium, the weight percent of semiconducting pyropolymeric inorganic refractory oxide material in said resistive component being in the range of from about 25% to about 90%, and said vehicle of said resistor ink upon drying providing electrical continuity between the resistive components.

2. The electrical conductor ink as set forth in claim 1 in which said mono-layer is formed on the surface of said base by passing a decomposable organic compound over the base at a temperature of from abou 400° to about 800°C.

3. The electrical conductor ink as set forth in claim 1 in which said base has a surface area of from 1 to 500 square meters per gram.

4. The electrical resistor ink as set forth in claim 1 in which said transition metal oxide is rhenium oxide.

5. The electrical resistor ink as set forth in claim 1 in which said transition metal oxide is ruthenium oxide.

6. The electrical resistor ink as set forth in claim 1 in which said transition metal oxide is titanium oxide.

7. The electrical resistor ink as set forth in claim 1 in which said transition metal oxide is zirconium oxide.

8. The electrical resistor ink as set forth in claim 1 in which said vehicle is varnish and isopropyl alcohol.

9. The electrical resistor ink as set forth in claim 1 in which said vehicle is a copolymer of vinyl chloride, vinyl acetate and vinyl alcohol, and methyl isobutyl ketone.

10. The electrical resistor ink as set forth in claim 1 in which said vehicle is an alkyl resin and mineral spirits.

11. The electrical resistor ink as set forth in claim 1 in which said vehicle is shellac and isopropyl alcohol.

12. The electrical resistor ink as set forth in claim 1 in which said vehicle is ethyl cellulose and methyl alcohol.

13. A resistor formed by applying the electrical resistor ink of claim 1 upon a solid surface and drying said ink.

14. The resistor as set forth in claim 13 in which said mixture of said ink is present in an amount of from about 50% to about 90% by weight of said resistor.

15. The electrical conductor ink as set forth in claim 1 in which said base is gamma-alumina.

* * * * *